United States Patent [19]

Ostromoukhov et al.

[11] Patent Number: 5,701,366
[45] Date of Patent: Dec. 23, 1997

[54] HALFTONING WITH GRADIENT-BASED SELECTION OF DITHER MATRICES

[75] Inventors: Victor Ostromoukhov, Lausanne, Switzerland; Smadar Nehab, Palo Alto, Calif.

[73] Assignee: Canon Information Systems, Inc., Costa Mesa, Calif.

[21] Appl. No.: 707,753

[22] Filed: Sep. 4, 1996

[51] Int. Cl.$^6$ ................................................ H04N 1/405
[52] U.S. Cl. ........................... 382/237; 358/457; 395/109
[58] Field of Search .......................... 382/237; 395/109; 358/455, 456, 457, 458, 460, 298, 534, 535, 536

[56] References Cited

U.S. PATENT DOCUMENTS

| | | | |
|---|---|---|---|
| 4,149,194 | 4/1979 | Holladay | 358/460 |
| 4,185,304 | 1/1980 | Holladay | 358/298 |
| 4,736,254 | 4/1988 | Kotera et al. | 358/457 |
| 5,014,333 | 5/1991 | Miller et al. | 382/466 |
| 5,045,952 | 9/1991 | Eschbach | 358/447 |
| 5,055,942 | 10/1991 | Levien | 358/456 |
| 5,243,443 | 9/1993 | Eschbach | 358/456 |
| 5,245,678 | 9/1993 | Eschbach et al. | 358/466 |
| 5,268,774 | 12/1993 | Eschbach | 358/466 |
| 5,278,670 | 1/1994 | Eschbach | 358/453 |
| 5,333,262 | 7/1994 | Ulichney | 382/237 |
| 5,341,225 | 8/1994 | Eschbach | 358/456 |
| 5,422,742 | 6/1995 | Ostromoukhov | 358/457 |
| 5,438,431 | 8/1995 | Ostromoukhov | 358/457 |
| 5,444,541 | 8/1995 | Small et al. | 356/432 |
| 5,495,345 | 2/1996 | Ulichney | 358/457 |

FOREIGN PATENT DOCUMENTS

95/27365  10/1995  WIPO.

OTHER PUBLICATIONS

B.E. Bayer, "An Optimum Method For Two-Level Rendition Of Continuous-Tone Pictures", IEEE 1973 International Conference On Communications, vol. 1, Jun. 1973, pp. 26.11–26.15.

T.M. Holladay, "An Optimum Algorithm for Halftone generation for Displays and Hard Copies", Proceedings of the Society for Information Display, vol. 21(2), 1980, pp. 185–192.

W. Purgathofer, et al., "Forced Random Dithering: Improved Threshold Matricies For Ordered Dithering", IEEE 1994, pp. 1032–1035.

J. Wild, "Design Of Multilevel Threshold Matricies For Ordered Dither Digital Halftoning, Optimized For Edge Sharpness, Detail Reproduction And Texture", IEEE 1989, pp. 2–43 to 2–45.

R. Miller, et al., "Mean-preserving multilevel halftoning algorithm", SPIE vol. 1913, Sep. 1993, pp. 367–377.

P. Emmel, et al., "A Grid–Based Method For Predicting The Behaviour Of Colour Printers", Proceedings of the Third IS&T/SID Color Imaging Conference, 1995, pp. 71–77.

V. Ostromoukhov, et al., "Artistic Screening", Computer Graphics Proceedings, SIGGRAPH '95, pp. 219–228.

I. Amidror, et al., "Spectral Analysis and Minimization of Moire Patterns In Color Separation", Journal of Electronic Imaging, vol. 3, No. 3, Jul. 1994, pp. 295–317.

(List continued on next page.)

Primary Examiner—Scott A. Rogers
Attorney, Agent, or Firm—Fitzpatrick, Cella, Harper & Scinto

[57] ABSTRACT

Halftoning gray scale image data includes selection of one of plural dither matrices based on an analysis of local tonality gradient for each target pixel. Plural different but reciprocally compatible dither matrices are defined, and for each target pixel in the gray scale image data, a local gradient for tonality is calculated. One of the dither matrices is selected in accordance with the calculated gradient, and the target pixel is thresholded using the selected dither matrix. Enhanced dithering according to the invention improves smoothness of gradations present in the invention, diminishes the "banding" or "contouring" effect found in natural images, and improves visual appearance and stability of business graphics, particularly in cases where a complex image contains both natural and computer generated business graphics.

25 Claims, 16 Drawing Sheets

OTHER PUBLICATIONS

V. Ostromoukhov, et al., "Two Approaches in Scanner–Printer Calibration: Colorimetric Space–Based vs. 'Closed–Loop'", Proceedings of the SPIE—The International Society of Optical Engineering, vol. 2170, 1994, pp. 133–142.

V. Ostromoukhov, et al., "Rotated Dispersed Dither: A New Technique For Digital Halftoning", Proceedings of the 21st International SIGGRAPH Conference, Jul. 1994, pp. 123–130.

V. Ostromoukhov, "Hermite Approximation For Offset Curve Computation", IFIP Transactions B (Applications in Technology), vol. B–9, 1993, pp. 189–196.

V. Ostromoukhov, "Reproduction Couleur Par Trames Irregulieres Et Semi–Regulieres", 1995.

R. Ulichney, *Digital Halftoning*, MIT Press, 1987, Chapters 5 and 6, pp. 77–186.

P. Fink, *PostScript Screening: Adobe Accurate Screens*, Adobe Press, 1992, Chapter 2, pp,. 15–26 and Chapter 7, pp. 89–98.

W.F. Schreiber, *Fundamentals of Electronic Imaging Systems*, Springer–Verlag 1993, pp. 145–167.

NORMALIZATION FACTOR = 10

COLOR MANAGEMENT SYSTEM

HALFTONING WITH GRADIENT-BASED SELECTION OF DITHER MATRICES

BACKGROUND OF THE INVENTION

1. Field of the Invention

The present invention relates to reproduction of digital image data for printing and visualization purposes, and in particular to a method for generating digital halftone images using a dither matrix technique. More specifically, the inventive halftoning technique halftones a particular target pixel by selecting from among different dither matrices based on tonal gradient of the target pixel. The inventive technique is particularly effective for binary physical output devices, such as ink-jet printers or the like.

2. Description of the Related Art

Digital computers commonly store images in bitmap format such that image data for each pixel of the image has a gray scale value, such as a value that ranges between 0 and 255 (i.e., an 8-bit system). Each gray scale value represents an increment of gray between a pure black value and a pure white value. In the case of color images, three color separations each include gray scale values for each pixel of the image, and if eight bits are used for each color separation, results in the possibility of representing $2^8 \times 2^8 \times 2^8 = 16,777,216$ different colors (commonly called "24-bit color").

Examples of how such images may be formed include the possibility of scanning an ordinary continuous tone photograph into a digital computer, so as to form bitmap image data at a particular pixel resolution, such as 300 or 600 dots per inch. The bitmap image data might thereafter be compressed using any of a variety of standard image compression techniques (such as "JPEG" or "GIF"), but before use even compressed images are uncompressed to bitmap image format.

Bitmap images containing pixels with gray scale image data are easily displayed on a computer monitor since each pixel of the monitor can be adjusted to a gray scale value. However, such images are unprintable by today's printers, because such printers can only print one (or, at most, a limited small number of) density value at each pixel. For example, at each pixel, a conventional laser beam printer or ink-jet printer is able to do only one of two things: (1) apply colorant (such a black or colored toner or ink) resulting in a completely filled-in or black pixel, or (2) refrain from applying colorant resulting in a completely white pixel. Since each pixel of the original image data has up to 256 different gray levels, it can be seen that a tremendous amount of information is lost during the printing process where, for each pixel, only a black or white value can be printed.

Recently, printers have become available which print a variable size dot at each pixel, but the amount of variation in the dot is only a few different levels, such as four. Accordingly, it can be seen that even with the most modern printers available, a tremendous amount of information is lost when printing a gray scale image or a color image with each color separation plane represented by a gray scale image.

A wide variety of halftoning processes have been proposed so as to minimize the information lost when printing, and so as to produce visually acceptable printed images of gray scale images. "Halftoning" is a process by which gray scale image data for pixels in a bitmap image are converted to pixels of binary image data for printout by a conventional printer. (Of course, in a situation where a printer can print multiple levels for each pixel, "halftoning" refers to the process by which gray level pixels are converted to corresponding N-ary values for printout by such a multi-level printer.) Perhaps the most popular halftoning processes now in use are those processes using ordered dithering methods. Ordered dithering methods use dither matrices of threshold values to obtain spatial dithering of clustered-dot or dispersed-dot repetitive binary patterns on output devices. As is well known, dither matrix methods tile the image plane with a dither matrix, and then compare, on a pixel-by-pixel basis, the gray scale image data of the bitmap image with the threshold stored in the dither matrix. A binary halftone output is produced by printing a pixel of the threshold is exceeded and by not printing if the threshold is not exceeded (or vice-versa depending on convention). Images produced using ordered dithering methods are generally visually pleasing, and produce an illusion of spatial continuity even when images are rendered on a binary device. Moreover, dither matrix methods can be implemented in software with relative ease. Thus, dithering techniques are extremely popular.

In spite of the numerous advantages of simple dither matrix techniques, an important drawback remains: the so-called "banding" or "contouring" effect. This effect is related to the limited area of the basic screen elements used in the traditional dithering, i.e., the limited area of the dither matrix, and the correspondingly limited number of gray levels reproducible by the dither matrix. The halftone image of FIG. 1 illustrates the problem of banding. The gray scale image data used to form FIG. 1's halftone image was composed of three different parts: a uniform vertical gray-scale ramp varying smoothly from pure black to pure white, which appears at 110 on the top-left part of the halftone image; a computer-generated business graphics 120 which appears on the bottom of the halftone image; and a natural image (a scanned photo) which appears at 130. The halftone image in FIG. 1. was produced using a simple dither tile 10 shown in FIG. 3(a), by repeatedly tiling the image plane as shown in FIG. 3(b) according to conventional dithering techniques well known to everybody skilled in the art. The area of dither matrix 10 is 10; therefore, according to a well-known rule, this technique permits to reproduce faithfully 11 distinct shades of gray. This is easily confirmed by referring to gray-scale ramp 110. The "banding" effect is clearly visible in different parts of natural image 130: e.g., on the brow and at 145 on the shoulder of the person. At the same time, the computer-generated business graphics part 120 does not show any noticeable drawback.

Several methods known in the art have been developed in order to address the banding effect problem. In a typical supercell method of addressing the banding effect, a large dither matrix is defined from a tiling of several smaller matrices, with the thresholds in each cell distributed according to an inter-cell well-dispersed distribution. Supercell approaches allow a greater number of distinct gray shades to be achieved. One example of a supercell matrix 12 is shown in FIG. 4, which is based on a technique known as "Combiscreen" and developed by the Applicant in his thesis "Reproduction Couleur Par Trames, Irregulieres et Semi-Regulieres", Ecole Polytechnique Federal De Lausanne (1995). FIG. 2 shows a halftone produced with the FIG. 4 supercell, according to the conventional dithering technique well known to everybody skilled in the art. The area of this supercell dither tile is 40; this technique is therefore able to reproduce faithfully 41 distinct gray shades.

The sample in FIG. 2 shows desirable diminishing of the banding effect, with respect to the image in FIG. 1. As a disadvantageous drawback, however, low frequency structures are introduced into the computer-generated business graphics parts 225 and 235 of the sample image. These low-frequency structures are distracting to a viewer, in that they are perceived as patterned artifacts particularly in highlights (i.e., very dark or very light regions).

FIGS. 5 through 8 are the same as FIGS. 1 through 4, except that hexagonal dither tiles are used in the place of the rectangular dither tiles of FIGS. 1 through 4. FIG. 5 illustrates that the banding effect does not disappear even when a hexagonal basic dither tile is used. The bi-level image in FIG. 4 was produced using the simple dither tile 14 shown in FIG. 7(a), tiled onto the image plane as shown in FIG. 7(b), according to conventional dithering techniques. The area of the dither tile 14 is 10; this technique is therefore able to reproduce faithfully 11 distinct gray shades. The sample in FIG. 5 shows the main drawbacks of that in FIG. 1: a strong banding effect in the areas of smooth gradations such as gray scale ramp 510 and natural image 530, particularly at 545.

The bi-level image in FIG. 6 shows the effect of using a supercell technique to decrease banding. This image was produced using the supercell dither matrix 16 in FIG. 8(b), which is based on the 30-cell hexagonal matrix 15 of FIG. 8(a), according to the conventional dithering technique well known to everybody skilled in the art. The area of this supercell dither tile is 90; this technique is therefore able to reproduce faithfully 91 distinct gray shades. The sample in FIG. 6 shows diminishing of the banding effect, with respect to the image in FIG. 5. However, distracting low frequency structures are clearly visible in the computer-generated business graphics parts 625 and 635 of the sample image.

Prior art patents related to dithering include U.S. Pat. No. 4,149,194 and U.S. Pat. No. 4,185,304, both to Holladay, which describe an electronic halftoning screening system which can be considered as the optimum solution for solving the problem of storage of the dither tile, in the general case. The patents disclose how to find a minimal rectangle which contains all information relative to the tiling, for any screen orientation.

Several conventional solutions which make usage of simple dither matrices have been proposed, such as W. F. Schreiber, *Fundamentals of Electronic Imaging Systems*, Springer-Verlag, 1993 and R. Ulichney, *Digital Halftoning*, MIT Press, 1987. In spite of numerous advantages of such a simple technique, the banding or contouring effect is not addressed.

Several methods are known in the art which try to address the banding effect problem. According to one such a method called CombiScreen, reported in the above-noted thesis of the Applicant, the dither tiles may contain several screen elements having any rational orientation and size. Threshold values are distributed among the cells of the dither tile so as to produce a large range of gray values, while at the same time preserving the clustered-dot behavior of individual screen elements. When rendering images at smoothly increasing intensity levels, this new method generates few contouring effects and other visible artifacts.

The method works equally well for quadratic, rectangular, parallelogram and hexagonally shaped screen elements. Resulting dither tiles are generally either of parallelogram or of hexagonal shape. CombiScreen enables the screen dot frequency or orientation to be chosen independently of the number of gray levels. The CombiScreen method belongs to the family of Supercell Dithering techniques, well known in the art, such as P. Fink, *PostScript Screening: Adobe Accurate Screens*, Mountain View, Calif., Adobe Press, 1992.

Numerous patents disclose adaptive features of the image processing and/or halftoning process.

U.S. Pat. No. 5,045,952 to Eschbach discloses a method of dynamically adjusting the threshold level of an error diffusion algorithm to selectively control the amount of edge enhancement introduced into the encoded output. The threshold level is selectively modified on a pixel by pixel basis and may be used to increase or decrease the edge enhancement of the output digital image. This is said to more closely represent the original detail and edge sharpness of the continuous tone input image.

U.S. Pat. No. 5,055,942 to Levien discloses a photographic image reproduction device using digital halftoning to screen images allowing adjustable coarseness. In the generation of screened halftones of photographic images for low resolution marking devices, conventional screen techniques are too coarse, and adaptive dither techniques are too fine. Levien attempts to preserve the advantages of the adaptive dither techniques, while creating screen patterns with an adjustable degree of coarseness. A hysteresis constant is applied, as are recursion techniques previously limited to adaptive screening with fixed dot patterns to vary the size of dots in the screened image. This is said to allow adjustment of image coarseness by adjusting the hysteresis constant.

U.S. Pat. No. 5,245,678 to Eschbach and Mailoux discloses a image conversion with lossy adaptive error diffusion. Gray level pixel values in an image, each pixel value represented by c levels, are quantized by applying a threshold level to each pixel value in the image to produce a pixel value having d levels, and thereafter applying a weighted portion of the value of the difference (the "error") between the pixel value and the thresholded value to a predetermined set of neighboring pixels. For each neighboring pixel in the predetermined set to which the error term is to be applied, the value of neighboring pixels is compared to each possible legal output value, and if any pixel values in the predetermined set of neighboring pixels is equal to ones of the legal output values, then the error term is not applied to that term, and is applied instead to remaining non-legal output values. If all the neighboring pixels have legal values, a decision is made based on a look-ahead neighborhood (a set of pixels used to determine the fractional error allocation) as to whether the error term is discarded or preserved. In the most simple case, the look-ahead neighborhood is identical to the error distribution neighborhood (the set of pixels to which a fractional error can be distributed) and the error term is discarded when all of the neighboring pixels have legal output values. In a more general case, the look-ahead neighborhood extends over an area larger than the error neighborhood, and the error term is only discarded when additional criteria are met, e.g. when all pixels in the larger look-ahead neighborhood have legal values.

U.S. Pat. No. 5,278,670 to Eschbach discloses a content-resolution conversion of color documents. An image processing system for preparing a document for printing, receives document images containing pictures and text at a first resolution which cannot be rendered by a selected printer. In such a system, there is provided an arrangement for determining the presence or absence of constant gray level over a small area of the document in each separation, and among the separations. Subsequent to such determination, a control signal representing the determination is produced that provides a selection of resolution conversion functions, one of which preserves gray density, and the other of which does not.

Although the above illustrates the efforts undertaken to address the problem of "banding" or "contouring" in regions of smooth gradations, it is seen that the problem is interrelated with the creation of undesirable structural artifacts in regions without gradation, particularly highlight regions. There therefore exists the need for further improvement.

SUMMARY OF THE INVENTION

The present invention improves on existing dither matrix halftoning techniques by providing plural dither matrices, with at least a first one being specially adapted for halftoning image regions without tonal gradations and at least a second one being specially adapted for halftoning image regions with smooth tonal gradations, and by selecting one dither matrix for halftoning a target pixel based on a gradient analysis of tonality of the target pixel. Preferably, the plural dither matrices are "reciprocally-compatible", which is defined below.

More generally, the present invention relates to the representation of digital image data for printing and/or visualization purposes and, in particular, to a method for generating digital halftone images using a plural matrix adaptive dithering technique which has the following specific features: (a) the image to be rasterized is analyzed prior to the halftoning phase in order to determine, for each target pixel of the image, the gradient class of the target pixel with respect to its neighbors, and (b) a plurality of different although reciprocally compatible dither matrices is used during the halftoning phase. According to the result of the image analysis during phase (a), and more specifically, according to the value of local gradient class detected, one of the plural reciprocally compatible dither matrices is selected in phase (b). "Reciprocal compatibility" of the dither matrices (or their corresponding dither tiles) means that (1) all supercell dither tiles used by the method are originated from the same basic tile, (2) all dither tiles have the same relative phases (or the same reference points), and (3) the normalized relative inter-tile differences in the supertile are all smaller than the normalized inter-pixel differences in the basic tile. The invention has turned out to be particularly efficient for physical output devices such as ink-jet printers or similar devices.

Exemplary outputs of improved dithering according to the invention are presented in FIGS. 9 and 10, with FIG. 9 corresponding to reciprocally-compatible dither matrices of parallelogram shape (compare FIGS. 1 and 2), and with FIG. 10 corresponding to reciprocally compatible dither matrices of hexagonal shape (compare FIGS. 5 and 6).

In FIG. 9, for those regions of the image where no gradient was detected (the computer-generated business graphics part 920 at the bottom) the simple dither tile 10 shown in FIG. 3(a) was applied. In the gradient-containing parts such as gray scale ramp 910 and natural image 930, the supercell dither tile 12 shown in FIG. 4 was applied. Both parts contain minimum specific artifacts: there is neither low-frequency structural artifacts in solid colors, nor the banding effect in the gradient-containing parts. FIG. 10 shows that the combination of both simple hexagonal dither tile 14 as in FIG. 7(a) and the hexagon-based supercell as in FIG. 8(b) can produce very satisfactory results, with minimum artifacts.

Thus, according to one aspect of the invention, halftone image data is obtained from corresponding gray scale image data by calculating a tonality gradient for a target pixel of the gray scale image data, with the tonality gradient being calculated based on a comparison between gray scale image data for the target pixel and gray scale image data for pixels adjacent the target pixel, and selecting one dither matrix from among plural dither matrices based on the tonality gradient. The gray scale image data for the target pixel is thereafter thresholded using the selected dither matrix so as to obtain halftone image data for the target pixel. Preferably, the plural dither matrices are reciprocally compatible, meaning that (1) a basic dither tile is used for low-gradient areas while supercell dither tiles derived from a basic dither tile are used for high-gradient areas, (2) all dither tiles have the same relative phase (or, the same reference point), and (3) the normalized relative inter-tile differences in the supercell tile are all smaller than the normalized inter-pixel differences in the basic tile. In one implementation of the invention, which needs only two different dither matrices, a tonality gradient is preferably calculated simply by comparing gray scale image data for the target pixel with gray scale image data for all immediately adjacent pixels, with a basic dither matrix tile being selected if all immediately adjacent pixels are the same as the target pixel, and with a supercell dither matrix tile being selected if any of the immediately adjacent pixels are different from the target pixel. Improved smoothness between selection transitions of the dither matrices can be obtained by using more than two dither matrices, and in such a case the tonality gradient is classified into a corresponding number of classes such as "no gradient", "low gradient", and "high gradient" in a case where three dither matrices are included.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 11:
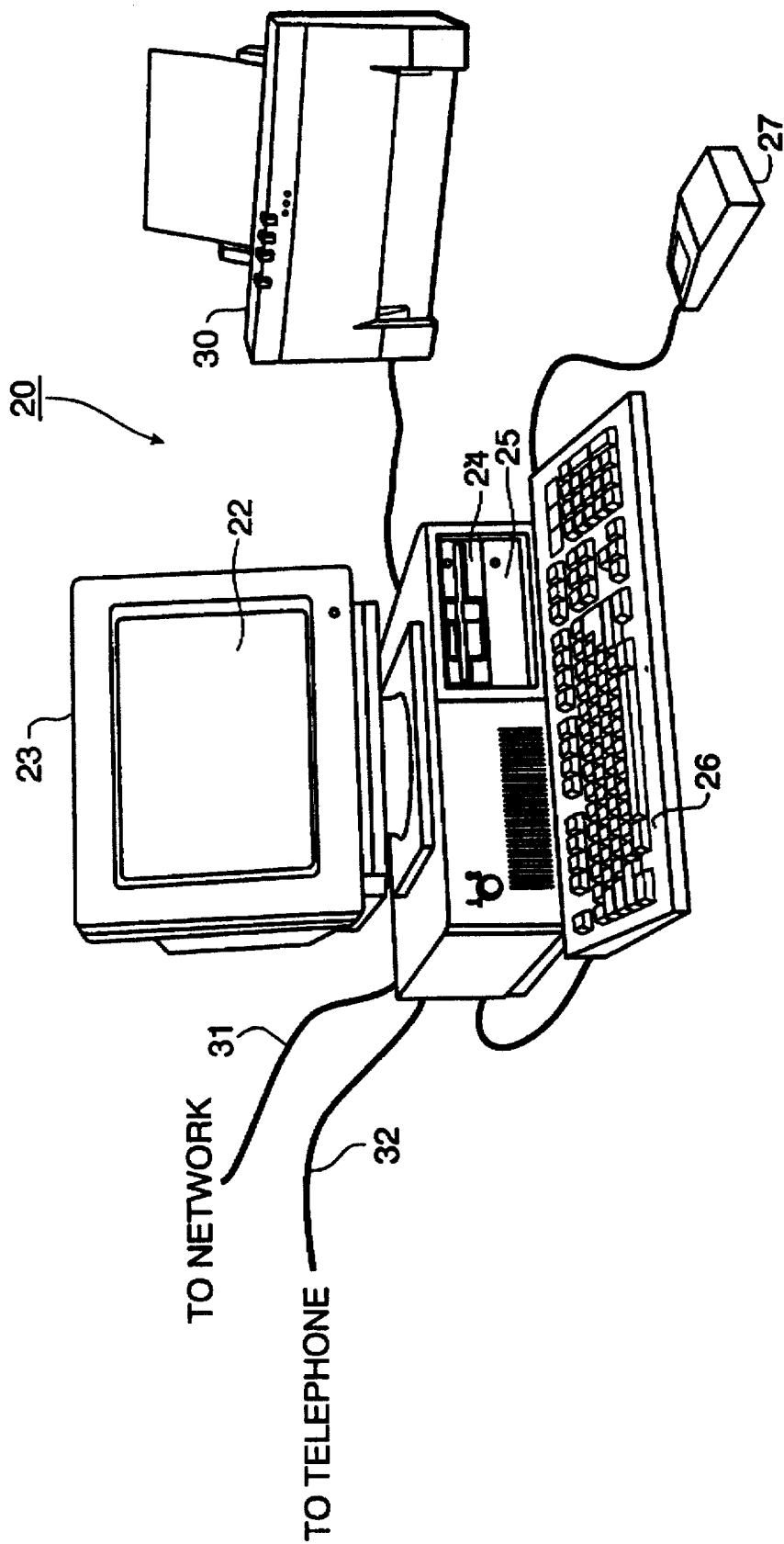
FIG. 11 is a view showing the outward appearance of representative computing equipment which incorporates enhanced dithering according to the invention.

FIG. 11 is a view showing the outward appearance of representative computing equipment which incorporates enhanced error diffusion according to the invention. Shown in FIG. 11 is computing equipment 20 such as an IBM PC or PC-compatible computer having a windowing operating system such as a Microsoft Windows operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects displayed on display screen 22, and a pointing device 27 such as a mouse or the like which is also provided to permit manipulation of objects on display screen 22. A conventional printer 30, such as a monotone or color laser beam printer or bubble jet printer, is also provided. Also provided are connections to a network 31 or to an ordinary voice telephone line 32, both for sending and receiving color image data as well as other files such as files which include program instruction sequences by which computing equipment 20 is operated.

While a bubble jet printer is presently preferred, any printer and preferably a color printer which forms full color images by mixing colorants in amounts set by corresponding color component values, such as a color laser beam printer or color thermal wax printer or the like, is suitable in the practice of the invention.

In accordance with operator instructions, and under control of the windowing operating system, stored application programs such as graphics application programs, drawing application programs, desktop publishing application programs and the like, are selectively activated to process and to manipulate data. Also in accordance with operator instructions, and based on those stored application programs, commands are issued to display images on monitor 23 and to print images appearing on monitor 23, and those images are then printed on printer 30 as described more fully hereinbelow.

Figure 12:
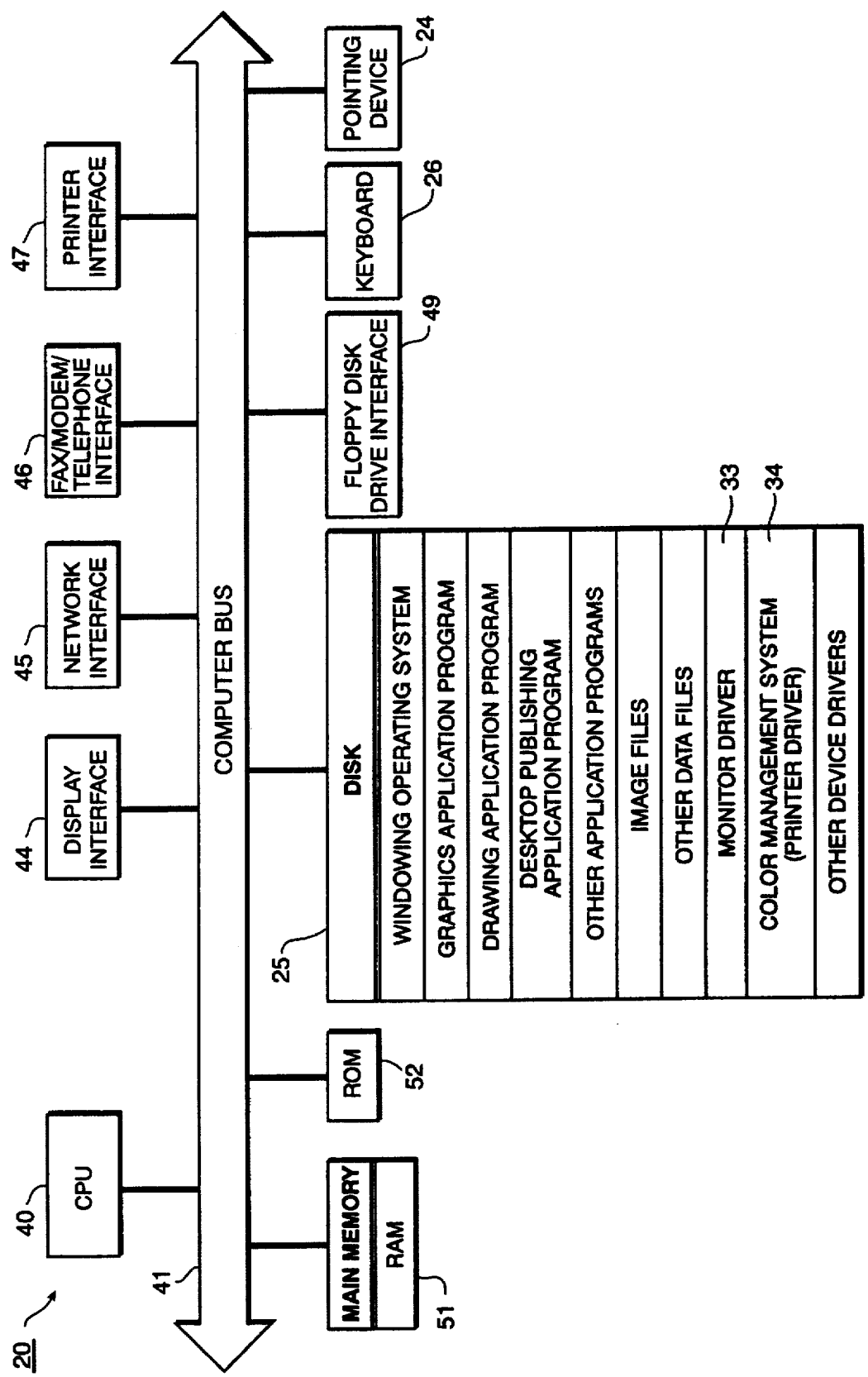
FIG. 12 is a detailed block diagram showing the internal construction of FIG. 11.

FIG. 12 is a detailed block diagram showing the internal construction of computing equipment 20. As shown in FIG. 12, computing equipment 20 includes a central processing unit (CPU) 40 such as programmable microprocessor interfaced to a computer bus 41. Also interfaced to computer bus 41 is display interface 44, network interface 45 for interfacing to network 31, fax/modem/telephone interface 46 for interfacing to telephone 32, printer interface 47, and floppy disk drive interface 49.

Main memory 51 such as random access memory (RAM) interfaces to computer bus 41 so as to provide CPU 40 with access to memory storage. In particular, when executing stored application program instruction sequences such as those associated with application programs stored on disk 25, CPU 40 loads those instruction sequences from disk 25 (or other storage media such as media accessed via network 31 or floppy disk drive 24) into main memory 51 and executes those stored program instruction sequences out of main memory 51.

ROM (read only memory) 52 is provided for storing invariant instruction sequences such as start-up instruction sequences or basic input/output operating system (BIOS) sequences for operation of keyboard 26.

As shown in FIG. 12, and as previously mentioned, fixed disk 25 stores program instruction sequences for the windowing operating system and for various application programs such as a graphics application program, a drawing application program, a desktop publishing application program, and the like. In addition, stored on fixed disk 25 are color image files such as are displayed on monitor 23 or printed on printer 30 under control of a designated application program. Fixed disk 25 also stores a monitor driver 33 which controls how RGB color primary values are provided to display interface 44, and color management system 34 which is a printer driver for controlling how CMYK color component values are provided to printer interface 47 for printout by printer 30. Enhanced dithering using gradient-based selection of dither matrices according to the invention, in this embodiment of the invention, resides in color management system 34. Other device drivers are also stored on fixed disk 25, for providing appropriate signals to the various devices (such as the network) connected in computing equipment 20.

Ordinarily, application programs and drivers stored on disk 25 need first to be installed by the user onto disk 25 from other computer readable media on which those programs and drivers are initially stored. For example, it is customary for a user to purchase a floppy disk or other computer readable media on which a copy of color management system 34 is stored. The user would then install color management system 34 onto disk 25 by inserting the purchased floppy disk into floppy disk drive 24 and by commanding CPU 40 to copy color management system 34 from the floppy disk onto disk 25. It is also possible for the user, via telephone 32 and modem interface 46, or via network 31 and network interface 45, to download color management system 34 from a computerized bulletin board to which the drivers had previously been uploaded.

Figure 13:
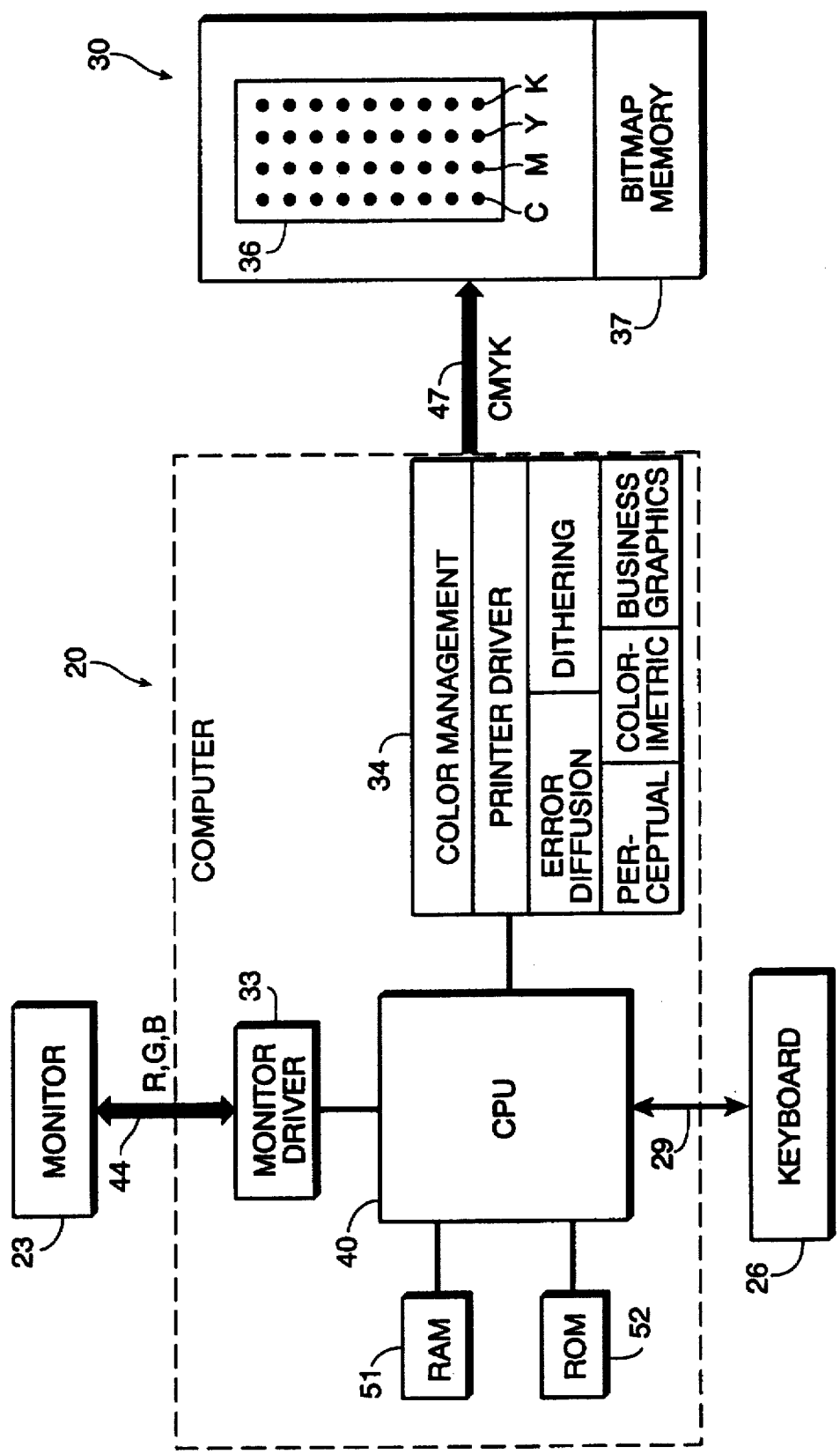
FIG. 13 is a functional block diagram which stresses functional connectivity of some of the elements of the FIG. 12 block diagram.

FIG. 13 is a functional block diagram showing how computer 20 interacts with monitor 23 and printer 30. Shown in FIG. 13 are computer 20 with monitor driver 33, color management system 34, CPU 40, RAM 51 and ROM 52, all arranged functionally rather than the structural view of FIG. 12.

As mentioned above, using keyboard 26, an operator can cause CPU 40 to execute stored program instructions which cause color images to be displayed on monitor 23 and which cause corresponding color images to be printed on color printer 30. Specifically, and in cooperation with the stored program instructions in the application program stored on disk 25, CPU 40 derives a color image, comprised of gray scale image data for each of three color primaries, for display on monitor 23. CPU provides the gray scale image data to monitor driver 33 which in turn derives gray-level RGB values for each pixel in the monitor 23. The RGB values are provided via display interface 44 to monitor 23 where those values are displayed. Since monitor 23 is a continuous tone analog device, the color image displayed on monitor 23 from the derived RGB values is a continuous tone image based on the gray-levels of each of the R, G and B values.

Upon request, CPU 40 also feeds the color image to color management system 34 for printing by color printer 30. Color management system 34 derives binary CMYK values for each pixel of the color image based on the gray scale image data for each of the three color primaries provided from CPU 40. The color management system 34 allows selection, ordinarily by the user but in some cases automatically by CPU 40, of whether to halftone by error diffusion halftoning or by dither matrix halftoning, and also of which one of plural color rendering modes, here, a perceptual rendering mode, a colorimetric rendering mode, and a business graphics rendering mode, to use. Whichever one of the plural color rendering modes is selected, however, the ultimate purpose of color management system 34 is to halftone-process the gray scale image data for each of the color primaries provided from CPU 40 so as to obtain binary CMYK values, and to provide the binary CMYK values to printer 30 for printing.

More particularly, for each pixel of an image on monitor 23, color management system 34 converts the gray-level RGB value of the pixel into a binary halftone value for each of the CMYK color components printed by printer 30. For example, if each pixel of the image on monitor 23 is represented by a 24-bit RGB value (i.e., eight bits for R, eight bits for G, and eight bits for B), color management system 34 obtains a digital halftone value in which each of the CMYK color components is represented by a single bit indicating whether a dot of the respective color component is to be printed at a corresponding pixel position by printer 30.

Thereafter, color management system 34 feeds the CMYK values via printer interface 46 to printer 30 where they are stored in bitmap memory 37 within printer 30. Bitmap memory 37 may store a full bitmap image of the printed image, or it may store only a band or partial bitmap image. When sufficient color data, namely binary halftoned CMYK data, is stored in bitmap memory 37, a color print head 36 reciprocates across a platen adjacent a sheet of paper. In one possible arrangement, print head 36 includes 32 ink jet nozzles arranged in a four column by eight row pattern. The nozzles in the first column all eject droplets of cyan ink; the nozzles in the second column all eject droplets of magenta ink; the nozzles in the third column all eject droplets of yellow ink; and the nozzles in the fourth column all eject droplets of black ink. The nozzles are controlled independently in accordance with the color data in bitmap memory 37 such that in one reciprocation of print head 36 across the platen, eight rows of pixels are printed.

Figure 14:
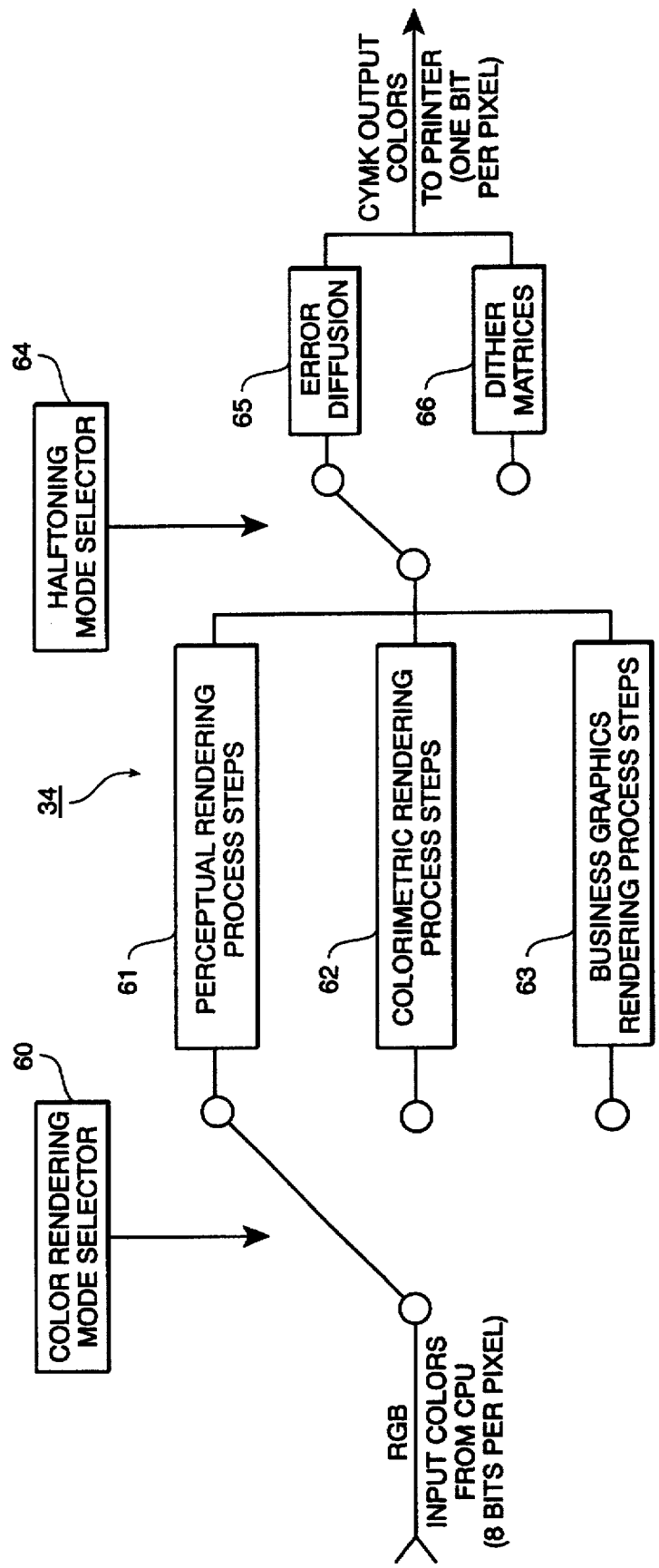
FIG. 14 is a functional view of a color management system including enhanced dithering according to the invention.

FIG. 14 is a view showing the functional arrangement of color management system 34. The color management system shown in FIG. 14 includes plural different color rendering modes, each tailored to modify color image data from CPU 40 so as to meet some color objective. As shown in FIG. 14, color management system 34 includes perceptual rendering process steps 61 which are best suited to natural color images, colorimetric rendering process steps 62 which are best suited to match to a given color, and business graphics rendering process steps 63 which are best suited to high-saturation graphic images. Color management system 34 further includes a rendering mode selector 60 which allows selection between one of the plural rendering modes of the color management system. Preferably, rendering mode selector 60 is a user manipulable graphical user interface which allows a user, after commanding an image to be printed, to select one of the plural rendering modes by which color management system 34 is able to render the image. Alternatively, it is also possible for rendering mode selector 60 to be actuatable automatically under control of CPU 40, in which case CPU 40 would make automatic selection of the proper rendering mode. Such automatic selection may, for example, be made based on the type of application software which is generating the image, based on data or image type, based on data structure, based on a histogram or other analysis of color distribution in the image, or the like. For example, all .BMP type data might have perceptual rendering automatically selected, while vector graphics might have business graphics rendering automatically selected, and so on.

Color management system 34 also includes a halftoning mode selector 64 which allows selection between halftoning by error diffusion process steps 65 or halftoning by dithering process steps 66. Dither process steps 66 are described in considerable detail below. Error diffusion process steps 65 may be any suitable error diffusion technique, such as any of the various modifications of basic Floyd-Steinberg error diffusion.

Based on the mode selected by halftoning mode selector 64, gray scale image data for each of the three color primaries, as fed from CPU 40 and as modified by the color rendering mode selected by 60, are fed for appropriate processing to the selected one of the halftoning modes, so as to generate printer binary CMYK colorant values.

Figure 15:
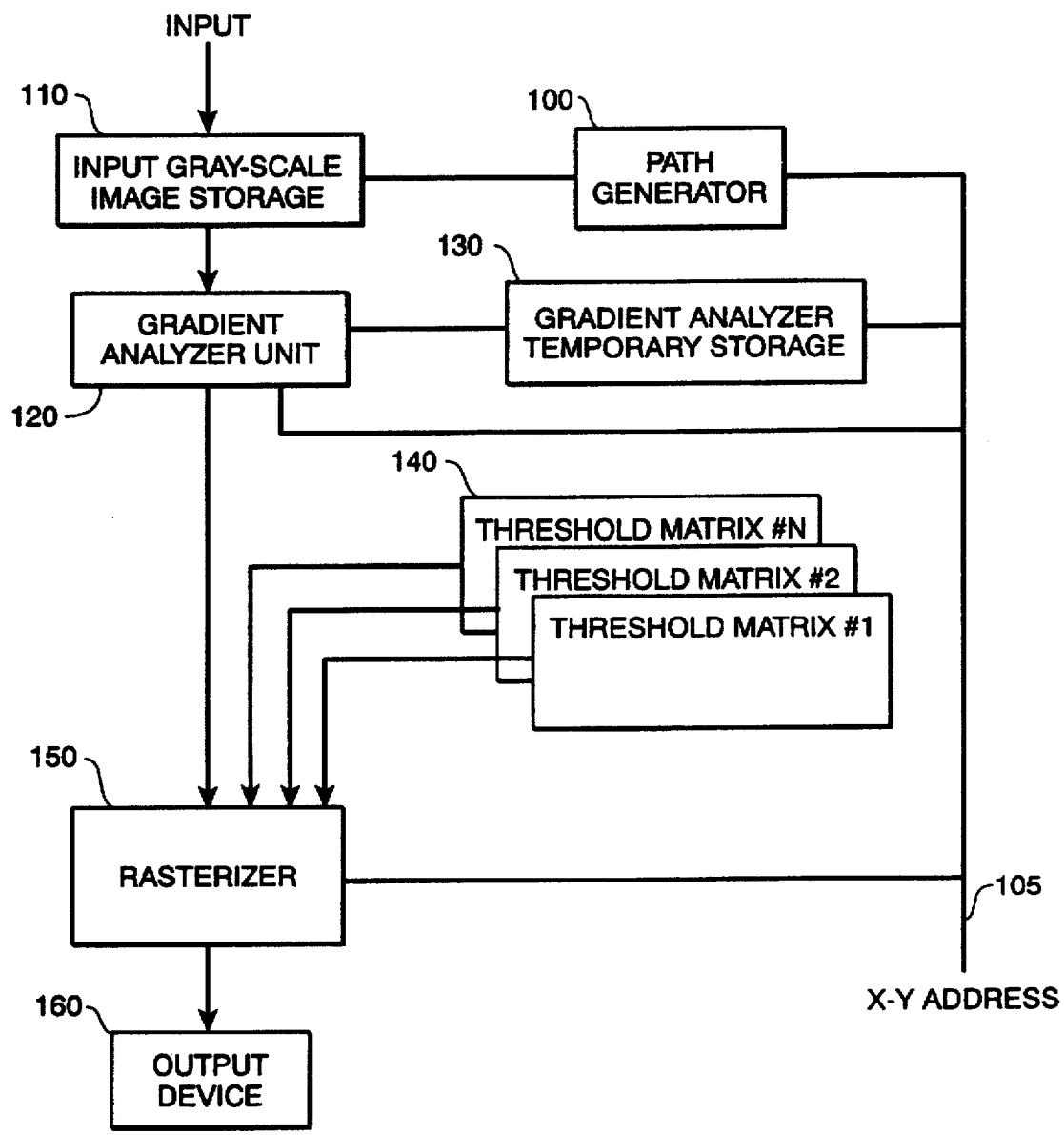
FIG. 15 is a block diagram showing an apparatus for performing enhanced dithering according to the invention.

FIG. 15 is a simplified block diagram of an apparatus for carrying out plural-matrix dithering according to the invention. The apparatus shown in FIG. 15 might be implemented as a physical apparatus, but more preferably the apparatus of FIG. 15 is implemented as software steps in connection with dither matrix halftoning steps 66.

As shown in FIG. 15, enhanced dithering according to the invention includes an input gray scale image storage section 110 for storing gray scale values for each of the three color components of a color image. A path generator 100 generates an x–y pixel address 105, which is used to generate the scanning path through image data in storage section 110, such as a serpentine scanning path, a scan-line scanning path, a blue-noise-modified scanning path, and the like. For each pixel address so generated, a target pixel from input-gray scale storage unit 110 is forwarded toward a gradient analyzer unit 120, which detects in the input image those regions belonging to each of at least two gradient classes, based on an analysis of gradient in tonality. For example, with two gradient classes, gradient analyzer 120 might simply distinguish between presence and absence of tonality gradient. For three gradient classes, gradient analyzer 120 might identify regions of no local gradient, small local gradient, and large local gradient. The gradient analyzer unit 120 may rely on some internal data structures stored in gradient analyzer temporary storage unit 130, for example, values of gray scale data for pixels adjacent the target pixel. This gradient-related information as well as the input image is transmitted to the rasterizer 150. The rasterizer applies one of conventional halftoning techniques, using the gradient-related information provided by the gradient analyzer unit 120. Preferably, a dithering technique, using thresholds stored in dither matrices is used in the rasterization unit 150. In this case a plurality of threshold dither matrices 140 is used by the rasterization unit 150, which selects, for each target pixel, which one of the dither matrices to use based on the gradient information. The binary image produced by the rasterizer unit 150 is led towards the output device interface 160.

For each target pixel, rasterizer unit 150 selects one of the dither matrices 140 based on the local gradient, provided from gradient analyzer 120, for the target pixel. Since in the preferred implementation the gradient analyzer 120 performs only a very rough evaluation of the local gradient, because of the processing time constraint, each of the dither matrices 140 is selected to be "reciprocally compatible". The reciprocal compatibility of the matrices means that (a) all supercell dither tiles originate from the same basic tile, (b) they have the same relative phases (the same reference points) and (c) the normalized relative inter-tile differences in the super-tile are smaller than the normalized inter-pixel differences in the basic tile.

Figure 1:
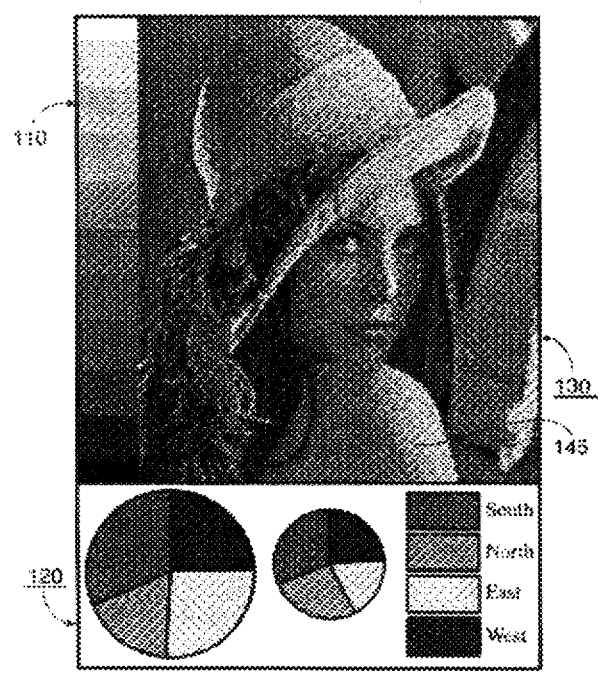
FIGS. 1 and 2 are representative halftone images illustrating the contour effect (FIG. 1) or the structural artifacts created when using supercells (FIG. 2).
Figure 2:
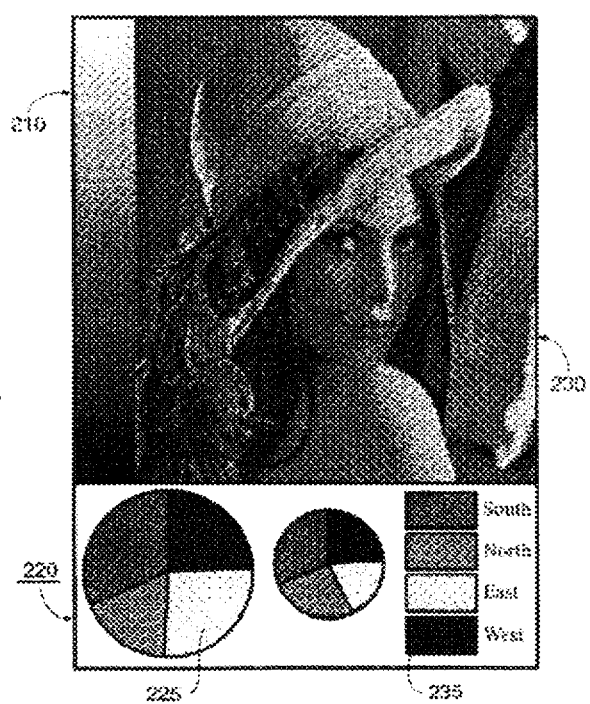
Figure 3A:
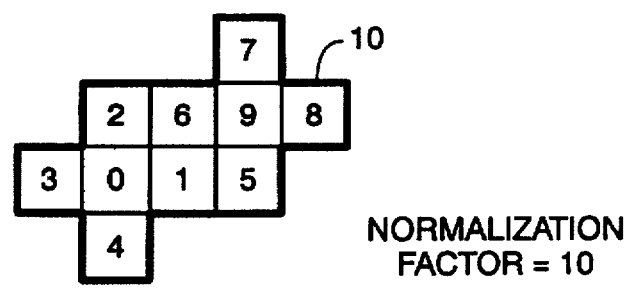
FIGS. 3(a) and 3(b) respectively show a basic dither matrix-and a tiling of the image plane using the basic dither matrix.
Figure 3B:
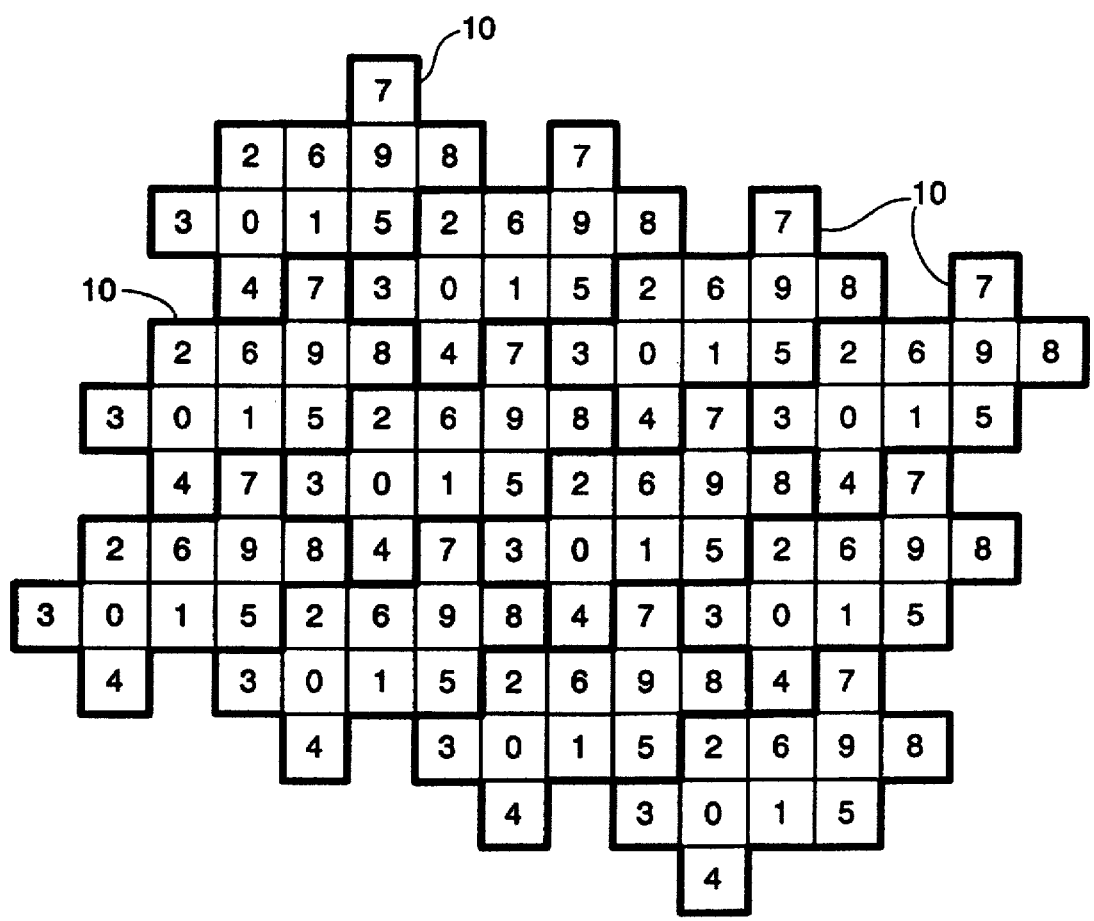
Figure 4:
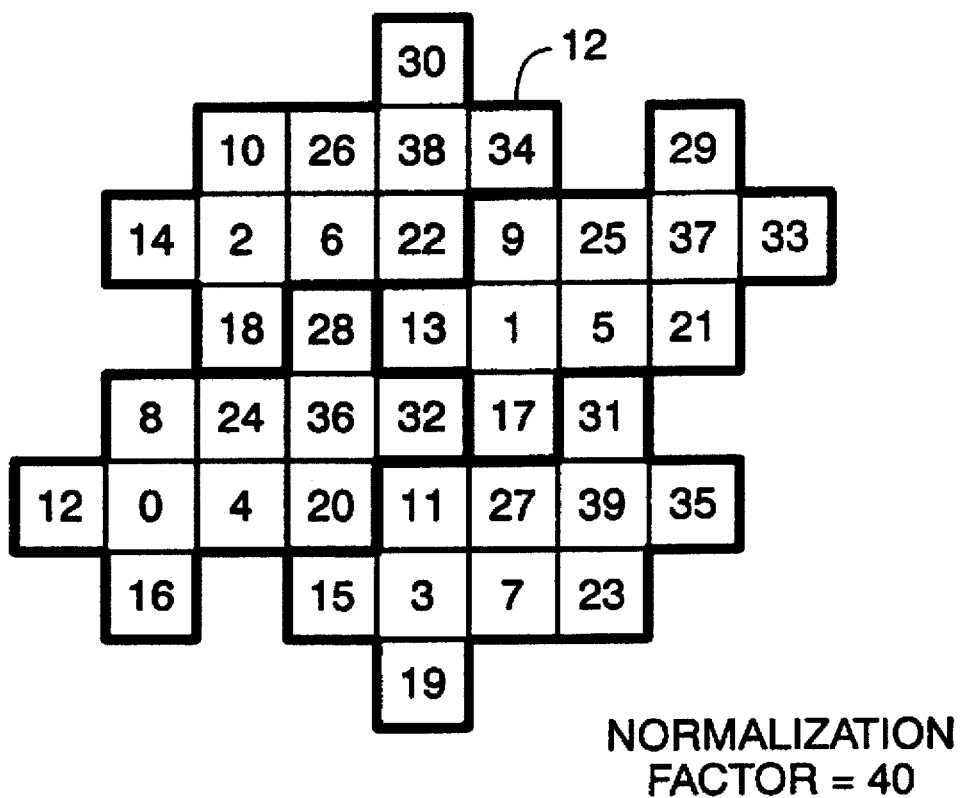
FIG. 4 is a supercell dither matrix derived from the dither matrix of FIG. 3(a).
Figures 5, 6:
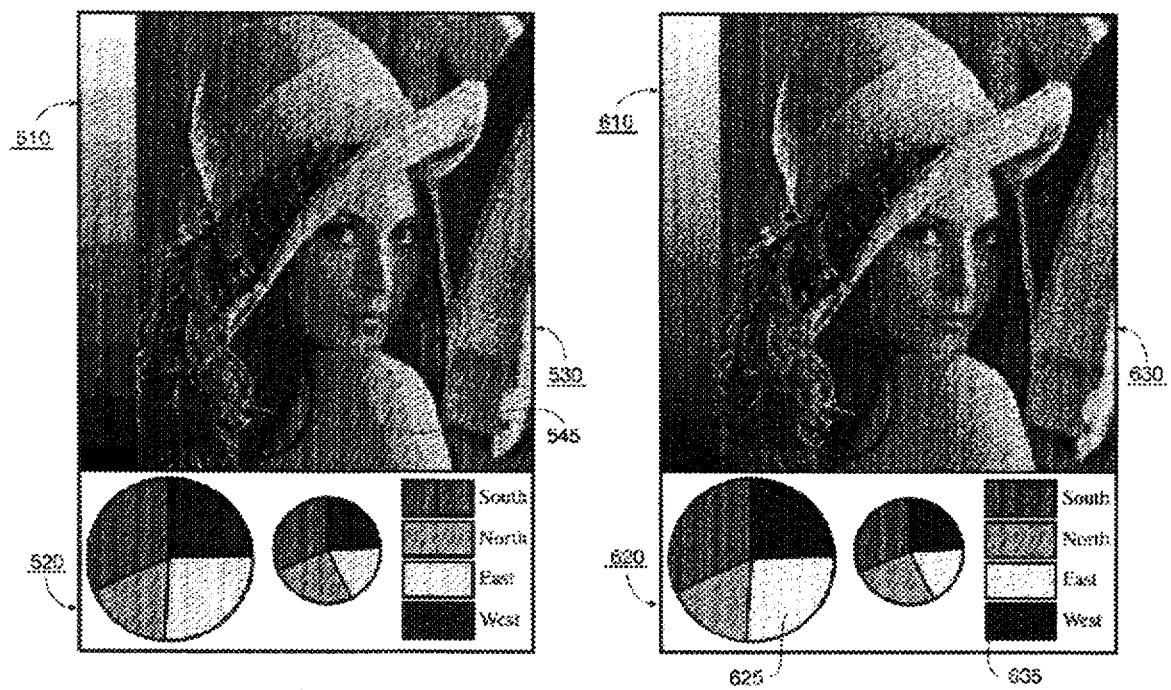
FIGS. 5 through 8 are views corresponding to those in FIGS. 1 through 4, but using a hexagonal dither tile rather than the rectangular dither tile used in FIGS. 1 through 4.

It turns out that dither matrices 10 and 12 of FIGS. 3(a) and 4 are both mutually "reciprocally compatible" in that dither matrix 12 originates from the basic tile of 10, dither matrices 10 and 12 have the same relative phases, and the normalized relative inter-tile difference between the supercell tiles are smaller than the normalized inter-pixel differences in the basis tile. This is explained in more detail below.

Figure 16A:
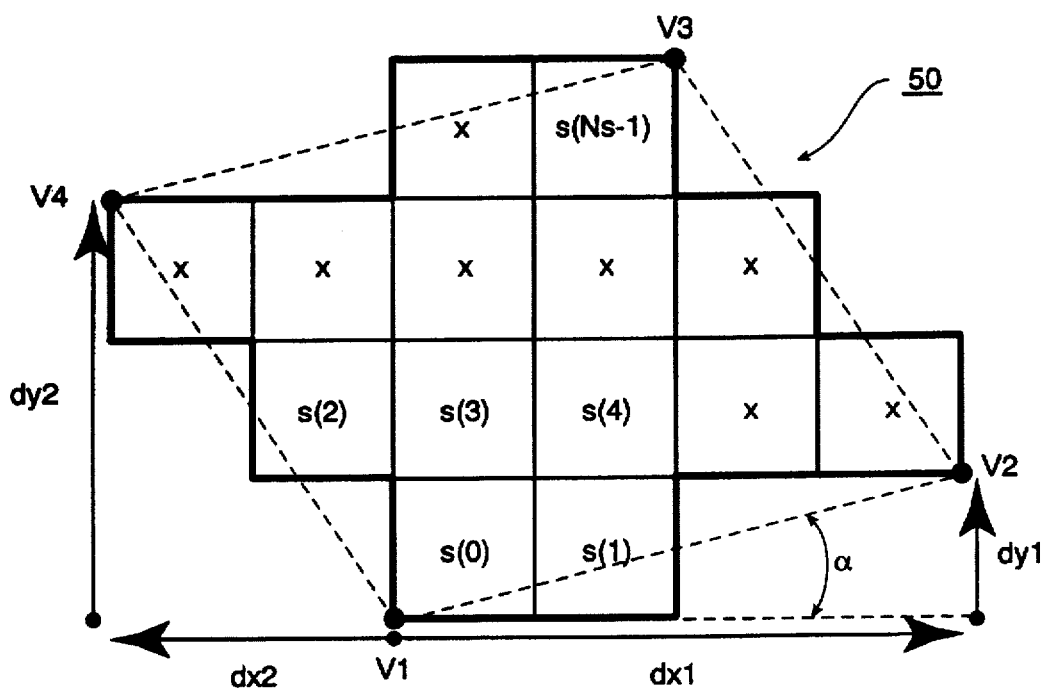
FIG. 16(a) shows a basic dither matrix tile and FIG. 16(b) shows how basic dither matrix tiles are grouped in order to form a supercell.
Figure 16B:
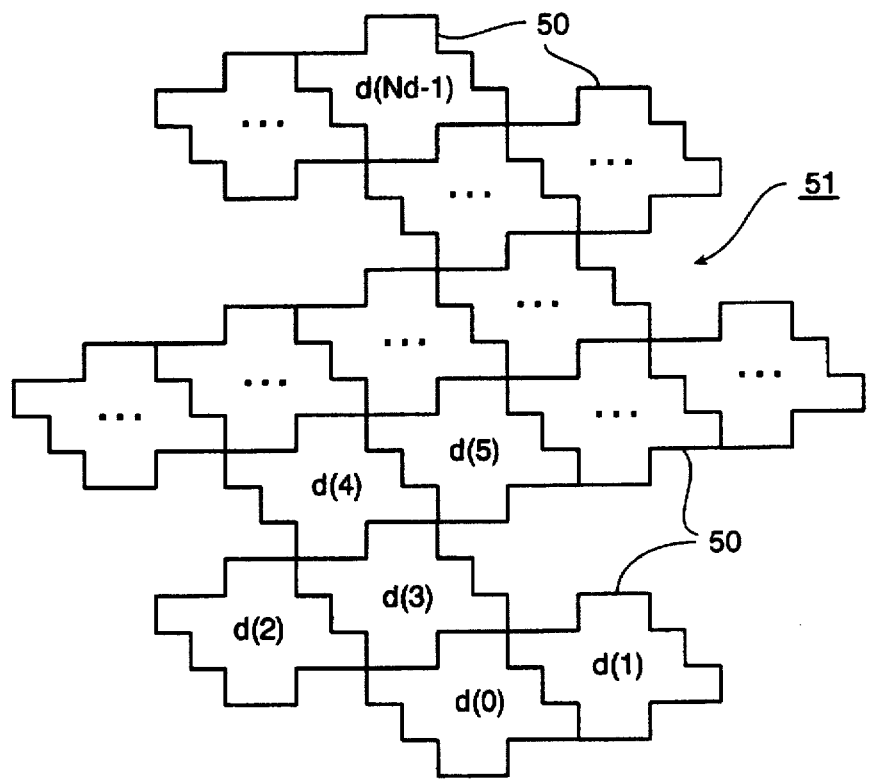
Figure 17:
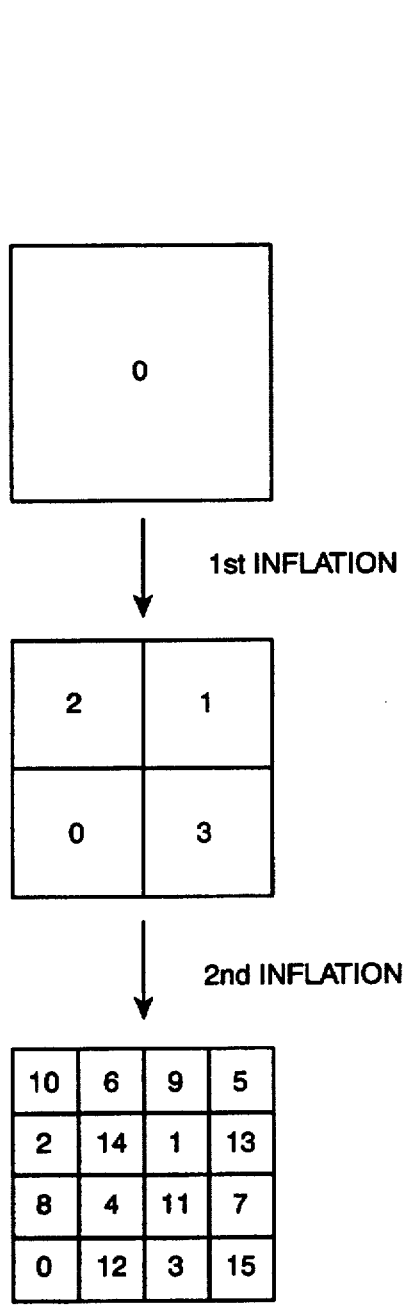
FIG. 17 illustrates one possible way to build a square distribution of individual cells into a supercell.

As background, FIGS. 16(a) and 16(b) illustrate the main principal of supercell building. In FIG. 16(a), an arbitrary dither matrix 50 contains $n_s$ different threshold values ranging from s(0) through s($n_{s-1}$). FIG. 16(b) shows how $n_d$ basic dither cells 50 are grouped together in order to form a single supercell 51 which is used to pave the output plane. FIG. 17 illustrates one possible way to build a square distribution of individual cells in a supercell, with the distribution illustrated in FIG. 17 commonly being referred to as a Bayer's distribution. Those skilled will recognize that the method of inflating individual cells to create a supercell that is depicted in FIG. 17 is easily adaptable to inflating polygons or rectangular tiles, as explained at length in the above-referenced thesis of the Applicant.

Figure 18:
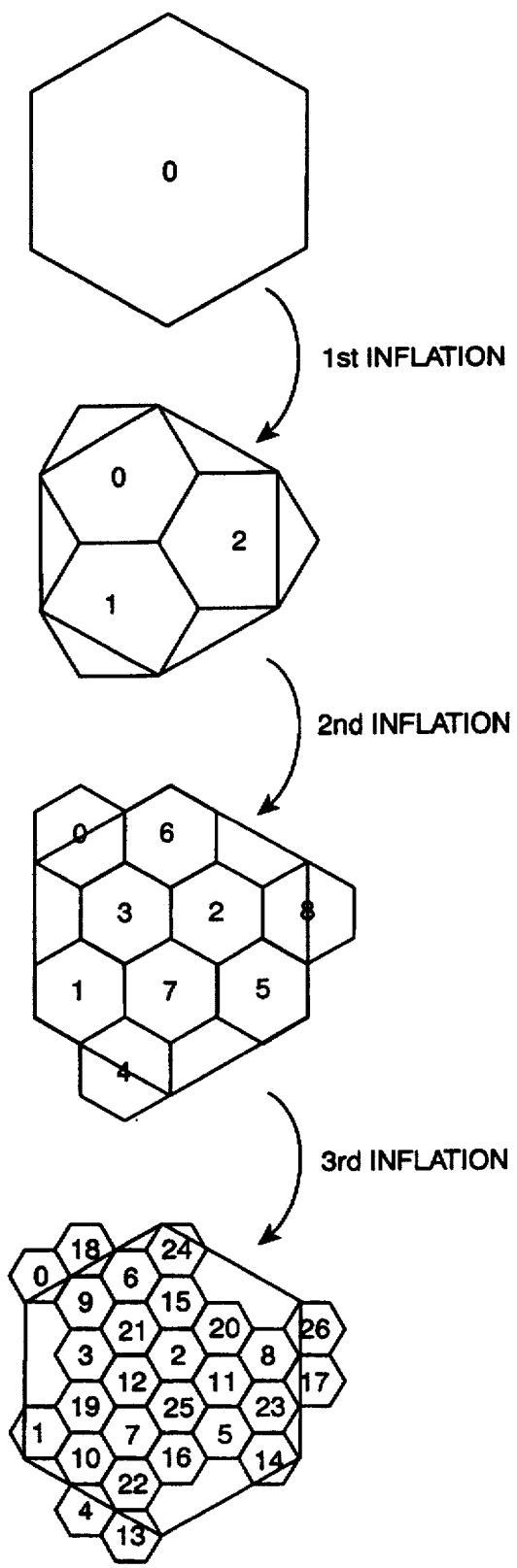
FIG. 18 illustrates one possible way to build a hexagonal distribution of individual cells into a supercell.

FIG. 18 illustrates one possible way to build a hexagonal distribution of individual cells in a supercell, and is included here for the sake of completeness.

Figure 19A:
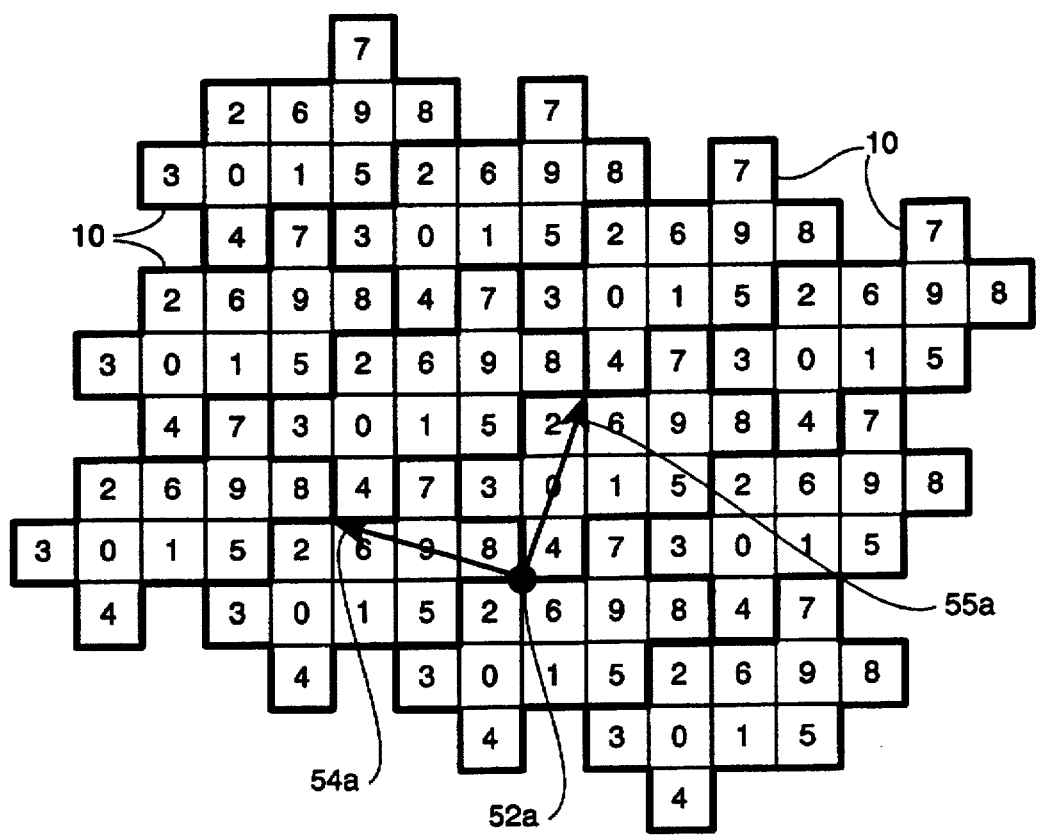
FIG. 19(a) and 19(b) are views for explaining reciprocal compatibility.
Figure 19B:
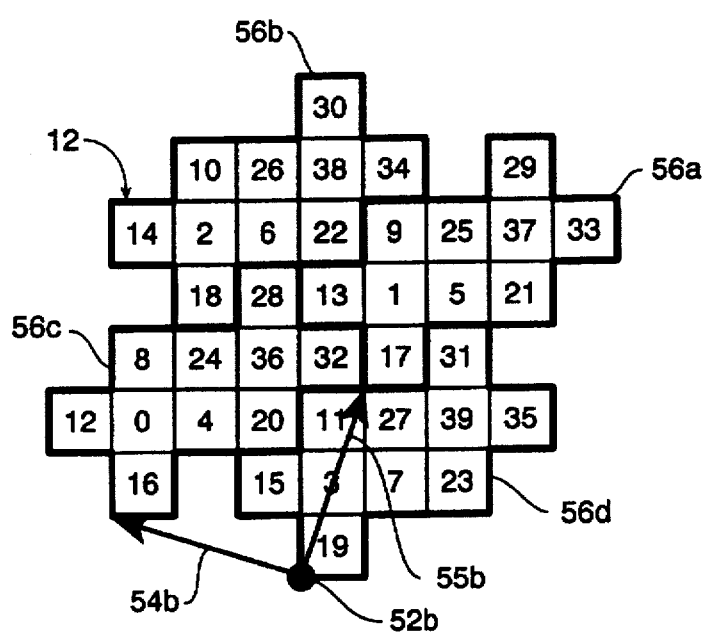

With this background in mind, it can be understood how dither matrix 10 is reciprocally compatible to dither matrix 12. Dither matrix 12 originates from the same basic tile as dither matrix 10; accordingly, dither matrices 10 and 12 satisfy the first criterion for being reciprocally compatible (i.e., all supercell dither tiles originate from the same basic tile). Referring to FIG. 19(a), point 52a is arbitrarily designated as the origin of dither tile 10. Accordingly, the phase of dither matrix 10 is defined by vectors 54a and 55a. It can be seen that these vectors (and consequently, the phase) are the same as corresponding vectors 54b and 55b for dither matrix 12 in FIG. 19(b). Accordingly, dither matrices 10 and 12 satisfy the second criterion for being reciprocally compatible, i.e., they have the same relative phases.

As for the third criterion for being reciprocally compatible, it can be seen that the normalized relative inter-tile differences in the supercell dither matrix 12 are all smaller than the normalized inter-pixel differences in the basic dither matrix. For example, consider basic dither tiles 56a, 56b, 56c and 56d which together make up supercell dither tile 12 in FIG. 19(b). Threshold values "16", "17", "18" and "19" are all in the same relative position of the basic tiles, and the normalized relative values of these thresholds are 16/40, 17/40, 18/40 and 19/40. The largest difference between these normalized relative values is therefore 3/40 (i.e., 19/40 minus 16/40). At the same time, within any one basic dither tile, such as dither tile 56d, the normalized inter-pixel differences are all 4/40 (i.e., the differences between 3/40, 7/40, 11/40, etc., which are the normalized threshold values in dither tile 56d). Thus, for supercell dither tile 12 in FIG. 19(b), the normalized relative inter-tile differences (3/40 or less) are all smaller than the normalized interpixel differences (4/40) of the basic dither tile. Accordingly, supercell dither matrix 12 satisfies the third criterion.

Figure 9:
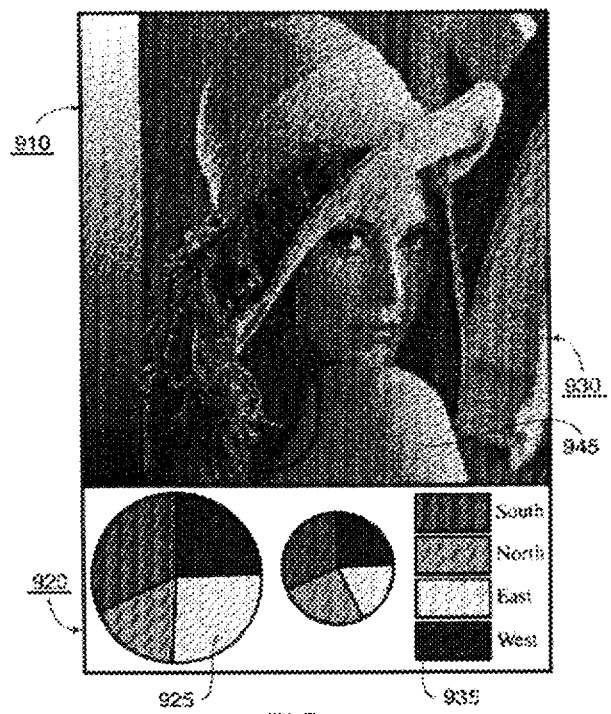
FIGS. 9 and 10 are halftone images illustrating the effect of the present invention, with FIG. 9 showing the effect using rectangular dither matrix tiles and with FIG. 10 showing the effect when using hexagonal dither matrix tiles.

Since dither matrices 10 and 12 are reciprocally compatible, they are excellent choices for use in dither matrix storage 140 in a case where gradient analyzer unit 120 identifies two different gradient levels. Indeed, as mentioned above, the sample halftone image of FIG. 9 was created using these two reciprocally compatible dither matrices.

Figure 7A:
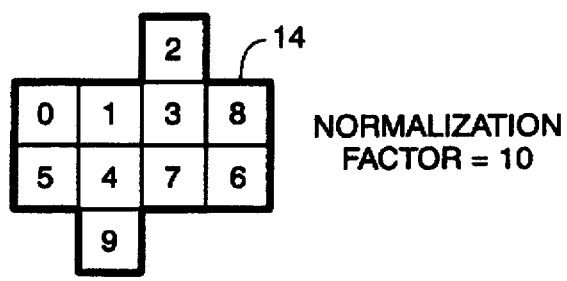
Figure 7B:
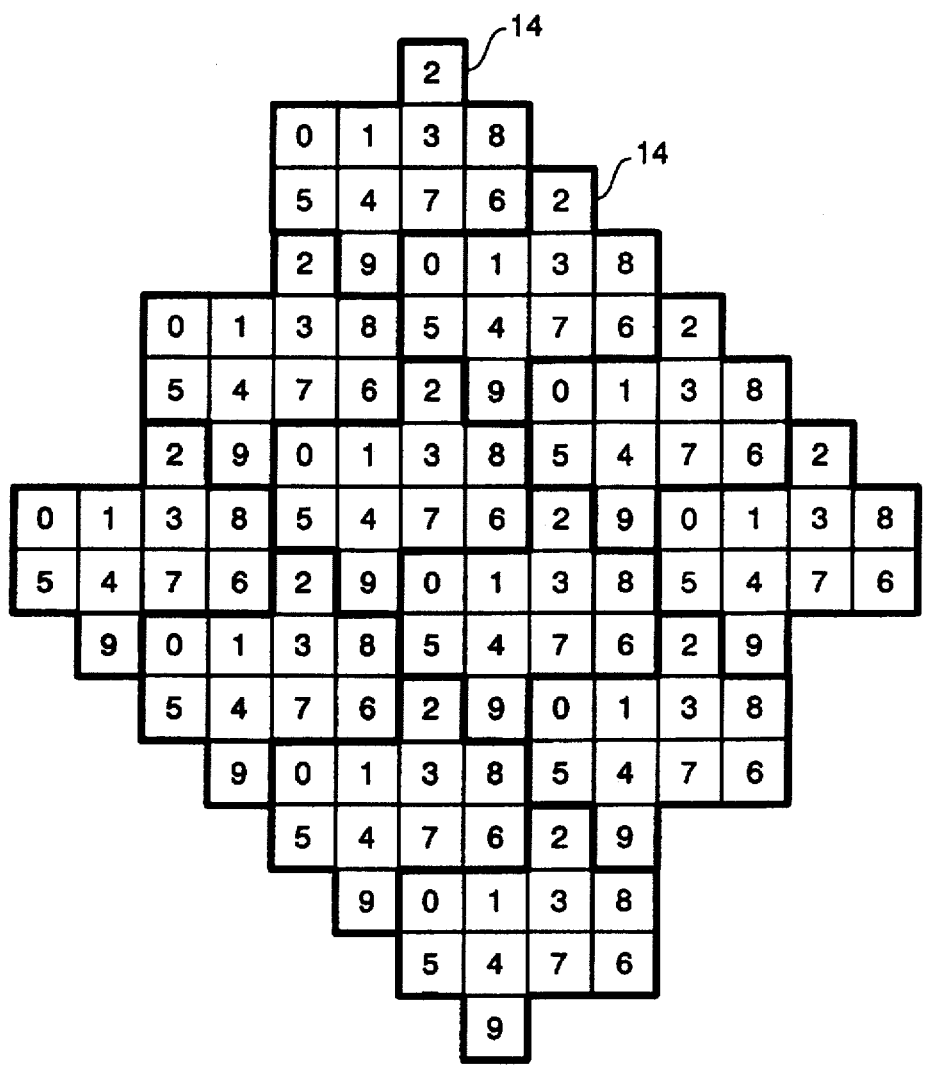
Figure 8A:
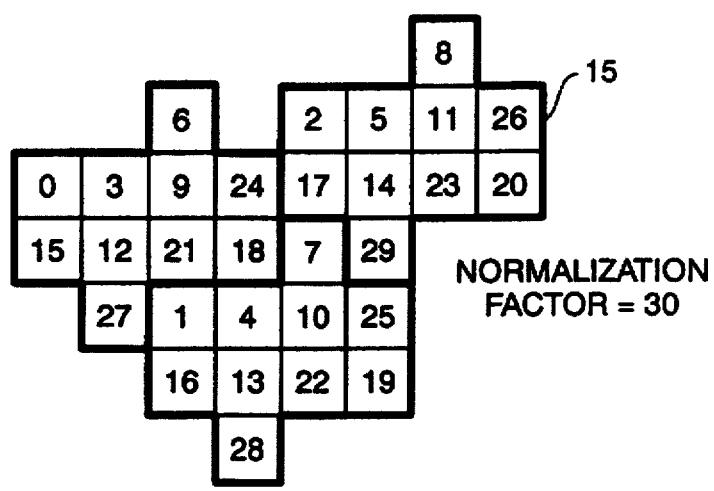
Figure 8B:
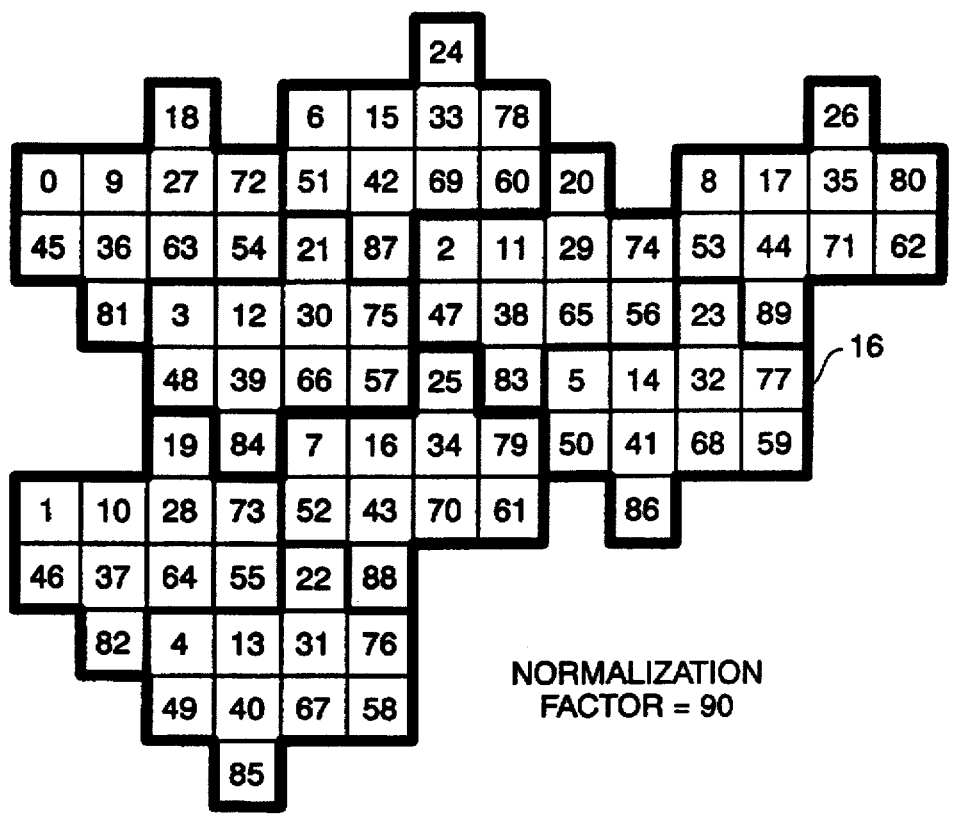
Figure 10:

It should also be noted that hexagonal dither matrices 14, 15 and 16, illustrated in FIGS. 7(a), 8(a) and 8(b), respectively, are all mutually reciprocally compatible and are therefore good choices for dither matrix storage 140 in a case where gradient analyzer unit 120 identifies three different gradient classes. It is also possible to use only two of these three dither matrices in a case where gradient analyzer unit 120 identifies two different gradient classes. Indeed, as mentioned above, the representative halftone image of FIG. 10 was produced by using hexagonal dither tiles 14 and 50 in dither matrix store 140 in a case where gradient analyzer unit 120 identified two different gradient areas.

Gradient analyzer unit 120 detects gradients by performing the following actions: for every target pixel, the gray-scale intensity level of the pixel is compared with the gray-scale intensity levels of all of its neighbors. If all comparisons provide no-difference, the resulting flag for the target pixel will be "NO_GRADIENT"; otherwise, if any of the neighboring pixels differs from the target pixel, the resulting flag will be "GRADIENT_IS_PRESENT".

The elementary technique described here has a "myopic" vision of a very local area around the processed pixel. Nevertheless, due to the reciprocal compatibility of the matrices used by this particular implementation, the difference in visual appearance between these two variants is not big, even if the technique detects gradient absence or presence erroneously. Accordingly, because the implementation of this gradient detection technique can be very fast and efficient, especially if the results of previous gradient detections are stored in the gradient analyzer temporary storage unit 130, this implementation is preferred.

Figure 20:
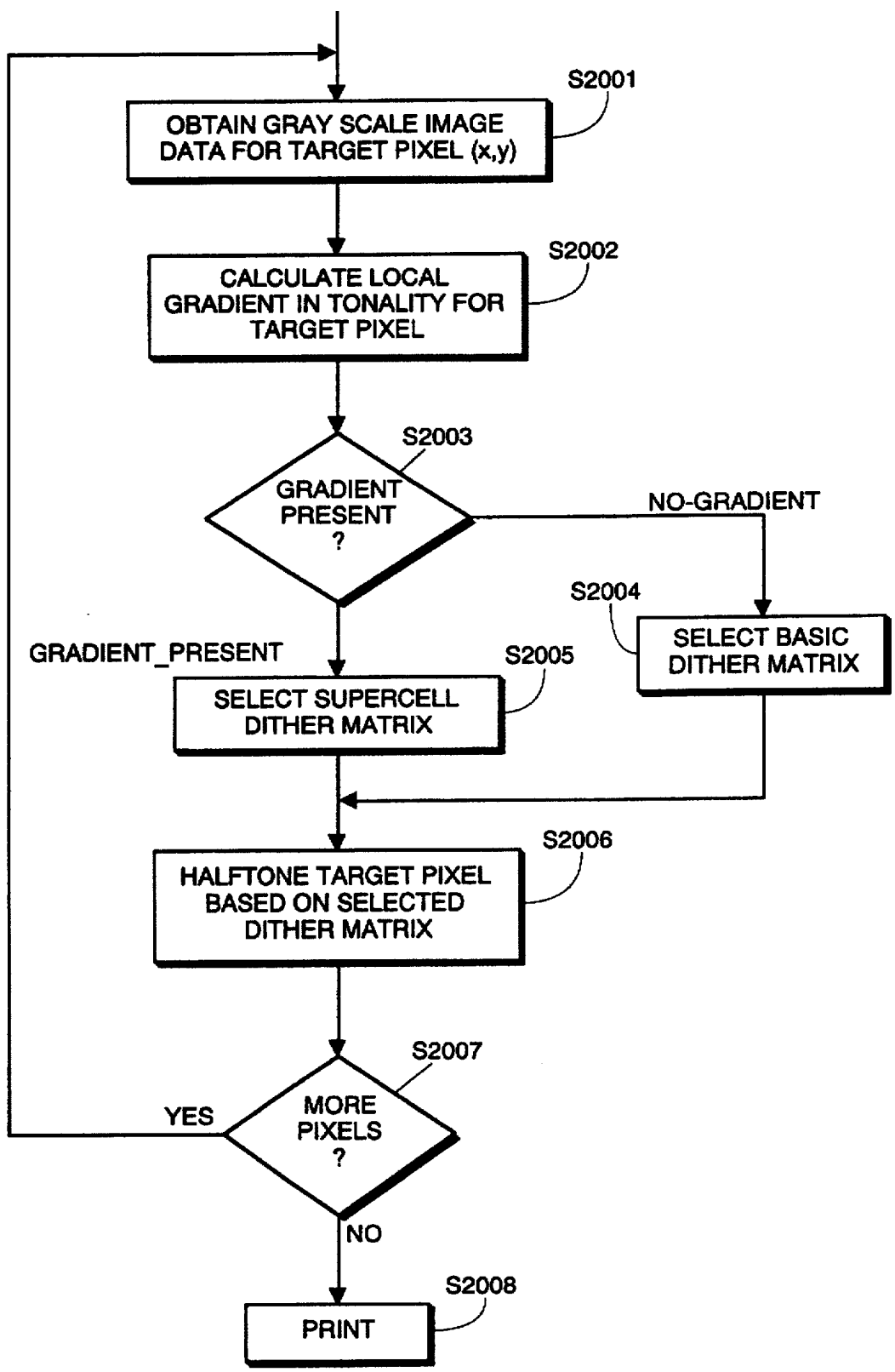
FIG. 20 is a flow diagram for explaining enhanced dithering according to the invention.

FIG. 20 is a flow diagram showing process steps forming a part of the dither matrix halftoning process steps at 66 (FIG. 14). Generally speaking, the process steps of FIG. 20 calculate a tonality gradient for a target pixel of gray scale image data, obtain access to plural dither matrices, select one of the dither matrices based on the tonality gradient, and threshold the gray scale image data for the target pixel using the selected dither matrix so as to obtain halftone image data for the target pixel.

In more detail, in step S2001, gray scale image data for a target pixel (x,y) is obtained from image storage section 110. Step S2002 then calculates a local gradient in tonality for the target pixel, as described above. The tonality gradient is classified either as NO_GRADIENT or GRADIENT_IS_PRESENT, and based on that classification, step S2003 selects either a basic dither matrix such as dither matrix 10 (step S2004) or a reciprocally-compatible supercell dither matrix such as matrix 14 (step S2005). Using the selected dither matrix, step S2006 halftones target pixel (x,y) by comparing the gray scale image data for the target pixel with the threshold in the selected dither matrix. The halftoning step of S2006 obtains a binary 1 or 0, corresponding to whether or not a pixel will be printed in the corresponding halftone image, based on the input gray scale value for the target pixel. Step S2007 determines whether any more pixels need to be processed, whereafter the halftone image is printed (step S2008).

More sophisticated gradient detections may be implemented in gradient analyzer unit 120. The number of distinct classes may be two, three or more. For example, in the three-classes implementation (or Three-Matrices Dithering), the three distinct classes may be labeled as "NO_GRADIENT", "SMALL_GRADIENT" and "BIG_GRADIENT". Rasterizer 150 switches between one of three different and reciprocally-compatible threshold matrices, according to the gradient class provided by the gradient analyzer 120.

The multiple dither matrix technique described and claimed herein exhibits the following advantages, when compared with the traditional (Mono-Matrix) halftoning methods: (1) it improves the smoothness of the gradations present in the image, diminishes the banding or contouring effect in natural images, with respect to the traditional clustered-dot dither of small size; (2) it improves visual appearance and stability of the business graphics images, with respect to the supercell dither techniques known in the art. The disclosed technique takes its maximal advantage when a complex images containing natural and computer-generated business graphic images are present on the same printed page.

It is emphasized that several changes may be applied on the above-described system without departing from the teaching of the invention. It is intended that all the matter contained in the present disclosure, or shown in the accompanying drawings, shall be interpreted as illustrative rather than limiting.

What is claimed is:

1. A method for obtaining halftone image data from corresponding gray scale image data, the gray scale image data being representative of pixels in an image and arbitrarily including values representative of both highlights and midtones for the image, said method comprising the steps of:
    calculating a local tonality gradient of gray scale image data for a target pixel, the tonality gradient being calculated based on a comparison between at least the gray scale image data for the target pixel and gray scale image data for a pixel adjacent the target pixel;
    selecting one dither matrix from among plural dither matrices based on the calculated tonality gradient, each of the plural dither matrices containing threshold values which differ from others of the plural dither matrices; and
    thresholding the gray scale image data for the target pixel using the selected dither matrix so as to obtain halftone image data for the target pixel.

2. A method according to claim 1, wherein the plural dither matrices are reciprocally compatible.

3. A method according to claim 2, wherein the plural dither matrices all originate from a common basic dither matrix, have a common relative phase, and include at least one supercell dither matrix and a basic dither matrix such that normalized relative inter-tile differences in the supercell dither matrices are smaller than the normalized inter-pixel differences in the basic dither matrix.

4. A method according to claim 1, wherein said plural dither matrices are comprised by first and second dither matrices, and wherein the tonality gradient is calculated by comparing the gray scale image data for the target pixel with gray scale image data for all immediately adjacent pixels, and wherein the first dither matrix is selected in a case where all gray scale data is the same and the second dither matrix is selected if any of the gray scale image data is different.

5. A method according to claim 1, wherein said plural dither matrices are comprised by first, second and third dither matrices, wherein the local tonality gradient is calculated by identifying the presence of a large gradient, no gradient, and at least one intermediate gradient, and wherein the first dither matrix is selected in a case where a large gradient is identified, the second dither matrix is selected in a case where no gradient is identified, and the third dither matrix is selected in a case where an intermediate dither matrix is identified.

6. A halftone printing method for printing a halftone image corresponding to a gray scale image, comprising the steps of:
    accepting a selection to halftone according to error diffusion or according to dithering;
    halftoning by error diffusion in a case where a selection to halftone according to error diffusion is selected;
    halftoning by dithering in a case where a selection to halftone according to dithering is selected;
    wherein in a case where halftoning according to error diffusion is selected (a) a local tonality gradient of gray scale image data for a target pixel is calculated based on a comparison between at least the gray scale image data for the target pixel and gray scale image data for a pixel adjacent the target pixel, (b) one dither matrix is selected from among plural dither matrices based on the calculated tonality gradient, each of the plural dither matrices containing threshold values which differ from others of the plural dither matrices, and (c) the gray scale image data is thresholded for the target pixel using the selected dither matrix so as to obtain halftone image data for the target pixel.

7. A method according to claim 6, wherein the plural dither matrices are reciprocally compatible.

8. A method according to claim 7, wherein the plural dither matrices all originate from a common basic dither matrix, have a common relative phase, and include at least one supercell dither matrix and a basic dither matrix such that normalized relative inter-tile differences in the supercell dither matrices are smaller than the normalized inter-pixel differences in the basic dither matrix.

9. A method according to claim 6, wherein said plural dither matrices are comprised by first and second dither matrices, and wherein the tonality gradient is calculated by comparing the gray scale image data for the target pixel with gray scale image data for all immediately adjacent pixels, and wherein the first dither matrix is selected in a case where all gray scale data is the same and the second dither matrix is selected if any of the gray scale image data is different.

10. A method according to claim 6, wherein said plural dither matrices are comprised by first, second and third dither matrices, wherein the local tonality gradient is calculated by identifying the presence of a large gradient, no gradient, and at least one intermediate gradient, and wherein the first dither matrix is selected in a case where a large gradient is identified, the second dither matrix is selected in a case where no gradient is identified, and the third dither matrix is selected in a case where an intermediate dither matrix is identified.

11. An apparatus for obtaining halftone image data from corresponding gray scale image data, the gray scale image data being representative of pixels in an image and arbitrarily including values representative of both highlights and midtones for the image, said apparatus comprising:

a memory for storing computer executable process steps, and for storing plural dither matrices, each of the plural dither matrices containing threshold values which differ from others of the plural dither matrices; and a processor for executing the process steps stored in said memory;

wherein said process steps include steps to (a) calculate a local tonality gradient of gray scale image data for a target pixel, the tonality gradient being calculated based on a comparison between at least the gray scale image data for the target pixel and gray scale image data for a pixel adjacent the target pixel, (b) select one dither matrix from among plural dither matrices based on the calculated tonality gradient, and (d) threshold the gray scale image data for the target pixel using the selected dither matrix so as to obtain halftone image data for the target pixel.

12. An apparatus according to claim 11, wherein the plural dither matrices are reciprocally compatible.

13. An apparatus according to claim 12, wherein the plural dither matrices all originate from a common basic dither matrix, have a common relative phase, and include at least one supercell dither matrix and a basic dither matrix such that normalized relative inter-tile differences in the supercell dither matrices are smaller than the normalized inter-pixel differences in the basic dither matrix.

14. An apparatus according to claim 11, wherein said plural dither matrices are comprised by first and second dither matrices, and wherein the tonality gradient is calculated by comparing the gray scale image data for the target pixel with gray scale image data for all immediately adjacent pixels, and wherein the first dither matrix is selected in a case where all gray scale data is the same and the second dither matrix is selected if any of the gray scale image data is different.

15. An apparatus according to claim 11, wherein said plural dither matrices are comprised by first, second and third dither matrices, wherein the local tonality gradient is calculated by identifying the presence of a large gradient, no gradient, and at least one intermediate gradient, and wherein the first dither matrix is selected in a case where a large gradient is identified, the second dither matrix is selected in a case where no gradient is identified, and the third dither matrix is selected in a case where an intermediate dither matrix is identified.

16. A halftone printing apparatus for printing a halftone image corresponding to a gray scale image, comprising:

accepting means for accepting a selection to halftone according to error diffusion or according to dithering;

halftoning means for halftoning by error diffusion in a case where a selection to halftone according to error diffusion is selected;

halftoning means for halftoning by dithering in a case where a selection to halftone according to dithering is selected;

wherein, in a case where halftoning according to dithering is selected, said process steps include steps to (a) calculate a local tonality gradient of gray scale image data for a target pixel, the tonality gradient being calculated based on a comparison between at least the gray scale image data for the target pixel and gray scale image data for a pixel adjacent the target pixel, (b) select one dither matrix from among plural dither matrices based on the calculated tonality gradient, each of the plural dither matrices containing threshold values which differ from others of the plural dither matrices, and (c) threshold the gray scale image data for the target pixel using the selected dither matrix so as to obtain halftone image data for the target pixel.

17. An apparatus according to claim 16, wherein the plural dither matrices are reciprocally compatible.

18. An apparatus according to claim 17, wherein the plural dither matrices all originate from a common basic dither matrix, have a common relative phase, and include at least one supercell dither matrix and a basic dither matrix such that normalized relative inter-tile differences in the supercell dither matrices are smaller than the normalized inter-pixel differences in the basic dither matrix.

19. An apparatus according to claim 16, wherein said plural dither matrices are comprised by first and second dither matrices, and wherein the tonality gradient is calculated by comparing the gray scale image data for the target pixel with gray scale image data for all immediately adjacent pixels, and wherein the first dither matrix is selected in a case where all gray scale data is the same and the second dither matrix is selected if any of the gray scale image data is different.

20. An apparatus according to claim 16, wherein said plural dither matrices are comprised by first, second and third dither matrices, wherein the local tonality gradient is calculated by identifying the presence of a large gradient, no gradient, and at least one intermediate gradient, and wherein the first dither matrix is selected in a case where a large gradient is identified, the second dither matrix is selected in a case where no gradient is identified, and the third dither matrix is selected in a case where an intermediate dither matrix is identified.

21. Computer-executable process steps stored on a computer readable medium, said process steps for obtaining halftone image data from corresponding gray scale image data, the gray scale image data being representative of pixels in an image and arbitrarily including values representative of both highlights and midtones for the image, said process steps comprising:

a calculating step to calculate a local tonality gradient of gray scale image data for a target pixel, the tonality gradient being calculated based on a comparison between at least the gray scale image data for the target pixel and gray scale image data for a pixel adjacent the target pixel;

a selecting step to select one dither matrix from among plural dither matrices based on the calculated tonality gradient, each of the plural dither matrices containing threshold values which differ from others of the plural dither matrices; and a thresholding step to threshold the gray scale image data for the target pixel using the selected dither matrix so as to obtain halftone image data for the target pixel.

22. Computer-executable process steps according to claim 21, wherein the plural dither matrices are reciprocally compatible.

23. Computer-executable process steps according to claim 22, wherein the plural dither matrices all originate from a common basic dither matrix, have a common relative phase, and include at least one supercell dither matrix and a basic dither matrix such that normalized relative inter-tile differences in the supercell dither matrices are smaller than the normalized inter-pixel differences in the basic dither matrix.

24. Computer-executable process steps according to claim 21, wherein said plural dither matrices are comprised by first and second dither matrices, and wherein the tonality gradient is calculated by comparing the gray scale image data for the target pixel with gray scale image data for all immediately adjacent pixels, and wherein the first dither matrix is selected in a case where all gray scale data is the same and the second dither matrix is selected if any of the gray scale image data is different.

25. Computer-executable process steps according to claim 21, wherein said plural dither matrices are comprised by first, second and third dither matrices, wherein the local tonality gradient is calculated by identifying the presence of a large gradient, no gradient, and at least one intermediate gradient, and wherein the first dither matrix is selected in a case where a large gradient is identified, the second dither matrix is selected in a case where no gradient is identified, and the third dither matrix is selected in a case where an intermediate dither matrix is identified.

* * * * *